US012080496B2

(12) United States Patent
Naumowicz et al.

(10) Patent No.: US 12,080,496 B2
(45) Date of Patent: Sep. 3, 2024

(54) CONTACTOR WITH INTEGRATED DRIVE SHAFT AND YOKE

(71) Applicant: Gigavac, LLC, Carpinteria, CA (US)

(72) Inventors: Samuel Naumowicz, Carpinteria, CA (US); Bernard Bush, Santa Barbara, CA (US); Murray Stephan McTigue, Carpinteria, CA (US); Daniel Sullivan, Santa Barbara, CA (US)

(73) Assignee: Gigavac, LLC, Carpinteria, CA (US)

( * ) Notice: Subject to any disclaimer, the term of this patent is extended or adjusted under 35 U.S.C. 154(b) by 0 days.

(21) Appl. No.: 17/348,557

(22) Filed: Jun. 15, 2021

(65) Prior Publication Data

US 2021/0391123 A1 Dec. 16, 2021

Related U.S. Application Data

(60) Provisional application No. 63/039,676, filed on Jun. 16, 2020, provisional application No. 63/090,796, (Continued)

(51) Int. Cl.
*H01H 3/32* (2006.01)
*H01H 1/06* (2006.01)
(Continued)

(52) U.S. Cl.
CPC ................ *H01H 3/32* (2013.01); *H01H 1/06* (2013.01); *H01H 3/02* (2013.01); *H01H 9/0271* (2013.01); *H01H 2003/0266* (2013.01)

(58) Field of Classification Search
CPC .. H01H 3/32; H01H 1/06; H01H 3/02; H01H 9/0271; H01H 1/20
(Continued)

(56) References Cited

U.S. PATENT DOCUMENTS 5,680,084 A 10/1997 Kishi
5,892,194 A * 4/1999 Uotome .............. H01H 51/065 335/154
(Continued)

FOREIGN PATENT DOCUMENTS

DE 102018110920 A1 8/2023
WO 2019201916 A1 10/2019

OTHER PUBLICATIONS

International Search Report and Written Opinion for App. No. PCT/US21/37495, dated Nov. 10, 2021, 15 pages.
(Continued)

*Primary Examiner* — Renee S Luebke
*Assistant Examiner* — Iman Malakooti
(74) *Attorney, Agent, or Firm* — Lee & Hayes, P.C.

(57) ABSTRACT

Contact assemblies are described herein having certain components, or portions thereof, that are formed integral to one another to reduce the complexity of manufacturing, improve the operation characteristics, and increase operational reliability of devices using the contact assemblies. New shapes to features and components of the contact assemblies are also disclosed, with the shapes providing the desired operational characteristics. Embodiments of the invention are also directed contactors or fuses (i.e., electrical switching devices) utilizing the contactor assemblies according to the present invention, and to electrical circuits and systems utilizing the electrical switching devices according to the present invention.

14 Claims, 9 Drawing Sheets

Related U.S. Application Data filed on Oct. 13, 2020, provisional application No. 63/117,919, filed on Nov. 24, 2020.

(51) Int. Cl.
*H01H 3/02* (2006.01)
*H01H 9/02* (2006.01)

(58) Field of Classification Search
USPC .................. 200/238; 335/131–133, 196, 197
See application file for complete search history.

(56) References Cited

U.S. PATENT DOCUMENTS

| | | | | |
|---|---|---|---|---|
| 9,013,254 | B2 | 4/2015 | Molyneux | |
| 9,030,280 | B2 * | 5/2015 | Takahashi | H01F 7/1615 335/131 |
| 9,916,952 | B2 * | 3/2018 | Blackmon | H01H 50/20 |
| 10,566,160 | B2 | 2/2020 | McTigue et al. | |
| 2016/0155592 | A1 * | 6/2016 | Ito | H01H 50/36 335/187 |
| 2019/0006140 | A1 * | 1/2019 | Shi | H01H 50/546 |
| 2021/0151269 | A1 * | 5/2021 | Hoffmann | H01H 9/302 |

OTHER PUBLICATIONS

Japanese Office Action mailed Oct. 10, 2023 for Japanese Patent Application No. 2023-511883, a foreign counterpart to U.S. Appl. No. 17/348,557, 10 pages.

Search Report for European Application No. 21826455.4, Dated Apr. 24, 2024, 7 pages.

* cited by examiner

CONTACTOR WITH INTEGRATED DRIVE SHAFT AND YOKE

This application claims the benefit of U.S. Provisional Patent Application Ser. No. 63/039,676, filed on Jun. 16, 2020, U.S. Provisional Patent Application Ser. No. 63/090,796, filed on Oct. 13, 2020, and U.S. Provisional Patent Application Ser. No. 63/117,919, filed on Nov. 24, 2020.

BACKGROUND

Field of the Invention

Described herein are devices relating to triggering mechanisms and configurations for use with electrical switching devices, such as contactor devices and electrical fuse devices.

Description of the Related Art

Connecting and disconnecting electrical circuits is as old as electrical circuits themselves and is often utilized as a method of switching power to a connected electrical device between "on" and "off" states. An example of one device commonly utilized to connect and disconnect circuits is a contactor, which is electrically connected to one or more devices or power sources. A contactor is configured such that it can change between "open" and "closed" states to interrupt or complete a circuit to control electrical power to and from a device. One type of conventional contactor is a hermetically sealed contactor.

In addition to contactors, which serve the purpose of connecting and disconnecting electrical circuits during normal operation of a device, various additional devices can be employed to provide overcurrent protection. These devices can prevent short circuits, overloading, and permanent damage to an electrical system or a connected electrical device. These devices include disconnect devices which can quickly break the circuit in a permanent way such that the circuit will remain broken until the disconnect device is repaired, replaced, or reset. One such type of disconnect device is a fuse. A conventional fuse is a type of low resistance conductor that acts as a sacrificial device. Typical fuses comprise a metal wire or strip that melts when too much current flows through it, interrupting the circuit that it connects.

As society advances, various innovations have resulted in electrical systems and electronic devices becoming increasingly common. An example of such innovations includes recent advances in electrical automobiles, which are becoming the energy-efficient standard and will likely replace most traditional petroleum-powered vehicles. In such expensive and routinely used electrical devices, overcurrent protection is particularly applicable to prevent device malfunction and prevent permanent damage to the devices. Furthermore, overcurrent protection can prevent safety hazards, such as electrical shock or electrical fires. These modern improvements to electrical systems and devices require improved solutions to increase convenience, reliability, and efficiency of mechanisms for triggering contactors and fuse devices.

SUMMARY

Described herein are different embodiments of contact assemblies having certain components, or portions thereof, that are formed integral to one another to reduce the complexity of manufacturing, improve the operation characteristics, and increase operational reliability. The present invention also provides for new shapes to components of the contact assemblies, with the shapes providing the desired operational characteristics. Embodiments of the invention are also directed contactors or fuses (i.e., electrical switching devices) utilizing the contactor assemblies according to the present invention, and to electrical circuits and systems utilizing the electrical switching devices according to the present invention.

One embodiment of a contact assembly according to the present invention comprises a movable contact having an underside and a topside surface. An upper yoke is included on the topside surface, with the upper yoke having an integral shaft extension passing through the movable contact. A lower yoke is included on the underside surface, and a drive shaft is included to move the movable contact. In some embodiments, the shaft extension can comprise full integrated shaft. In still other embodiments, the shaft extension can extend at least through the movable contact, with a separately formed drive shaft (or drive shaft portion) mounted to the shaft extension.

One embodiment of an electrical switching device according to the present invention comprises a housing, and internal components within the housing. The internal components comprise fixed contacts electrically isolated from one another, with the fixed contacts at least partially surrounded by the housing. A moveable contact is included having a top surface and a bottom surface, with the movable contact being movable to allow current flow between the fixed contacts when movable contact contacts the fixed contacts. An upper yoke is included on the top surface, and the upper yoke has an integral shaft extension passing through the moveable contact. A drive shaft is included to move the moveable contact.

One embodiment of an electrical system according to the present invention comprises an electrical circuit, and an electrical switching device electrically connected to the electrical circuit to open or close the circuit. The electrical switching device comprises a housing and internal components within the housing. The internal components comprise fixed contacts electrically isolated from one another, and a moveable contact having a top surface and a bottom surface. The moveable contact is movable to allow current flow between fixed contacts when the movable contact contacts the fixed contacts. An upper yoke is included on the top surface, with the upper yoke having an integral shaft extension passing through the moveable contact. A drive shaft is included to move the moveable contact.

These and other further features and advantages of the invention would be apparent to those skilled in the art from the following detailed description, taken together with the accompanying drawings, wherein like numerals designate corresponding parts in the figures, in which:

DETAILED DESCRIPTION

Figure 1:
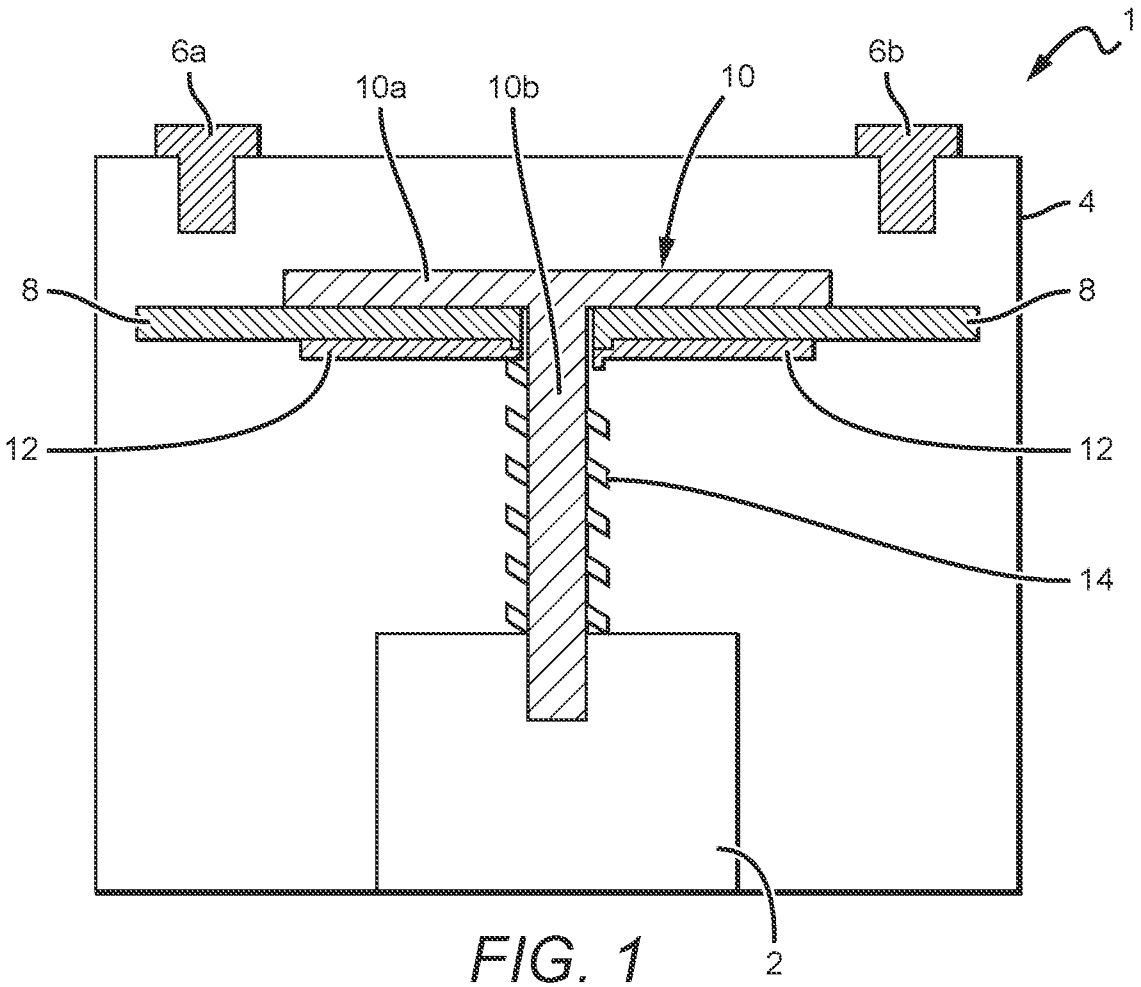
FIG. 1 is a simplified sectional view of one embodiment of contactor according to the present invention.

The present disclosure will now set forth detailed descriptions of various embodiments of switching devices according to the present invention. These switching devices can be electrically connected to an electrical device, circuit, or system to turn power to the connected device, circuit, or system from "on" or "off", or between these states.

As described in detail below, contactors (and fuses) can have fixed contacts and a movable contact. The movable contact moves in and out of contact with the fixed contacts to switch between a "closed" and "open" state. When the movable contact is moved in contact with the fixed contacts there is a holding or closing force to hold the movable contact in that position. The closing force between the fixed and movable contacts can be overcome by a repulsive levitation force. This levitation force can be generated by the current flowing through the contacts and can cause separation of the fixed and movable contacts during elevated current flow. This undesired separation between the movable contact and fixed contact can result in an unintended interruption in the operation of electrical system. The separation can also result in arcing between the fixed and movable contacts.

To provide a closing force to oppose this levitation force, yokes can be included on the movable contact. The yokes generate a magnetic field that acts to provide further closing force against the levitation opening force. In different embodiments according to the present invention, the upper yoke can be formed with an integral shaft extension that passes through the movable contact. The drive shaft can be manufactured separately and then connected to the shaft extension. Alternatively, the full drive shaft can be formed as an integral component to the upper yoke and its extension during manufacturing. These arrangements can improve the holding force of the upper and lower yoke against levitation forces, and can simplify manufacturing of the contactor device using the new upper yoke and drive shaft component. This arrangement can also increase reliability of the contactor device. The upper and lower yokes can also comprise different features such as extensions, protrusions, or indentations to produce the desired magnetic field between the upper and lower yokes.

Throughout this description, the preferred embodiment and examples illustrated should be considered as exemplars, rather than as limitations on the present invention. As used herein, the term "invention," "device," "present invention," or "present device" refers to any one of the embodiments of the invention described herein, and any equivalents. Furthermore, reference to various feature(s) of the "invention," "device," "present invention," or "present device" throughout this document does not mean that all claimed embodiments or methods must include the referenced feature(s).

It is also understood that when an element or feature is referred to as being "on" or "adjacent" to another element or feature, it can be directly on or adjacent to the other element or feature or intervening elements or features may also be present. It is also understood that when an element is referred to as being "attached," "connected" or "coupled" to another element, it can be directly attached, connected, or coupled to the other element or intervening elements may be present. In contrast, when an element is referred to as being "directly attached," "directly connected" or "directly coupled" to another element, there are no intervening elements present.

Relative terms, such as "outer," "above," "lower," "below," "horizontal," "vertical" and similar terms, may be used herein to describe a relationship of one feature to another. It is understood that these terms are intended to encompass different orientations in addition to the orientation depicted in the figures.

Although the terms first, second, etc. may be used herein to describe various elements or components, these elements or components should not be limited by these terms. These terms are only used to distinguish one element or component from another element or component. Thus, a first element or component discussed below could be termed a second element or component without departing from the teachings of the present invention.

The terminology used herein is for describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," when used herein, specify the presence of stated features, integers, steps, operations, elements, and/or components, but do not preclude the presence or addition of one or more other features, integers, steps, operations, elements, components, and/or groups thereof.

Embodiments of the invention are described herein with reference to different views and illustrations that are schematic illustrations of idealized embodiments of the invention. As such, variations from the shapes of the illustrations as a result, for example, of manufacturing techniques and/or tolerances are expected. Embodiments of the invention should not be construed as limited to the particular shapes of the regions illustrated herein, but are to include deviations in shapes that result, for example, from manufacturing.

It is understood that when a first element is referred to as being "between," "sandwiched," or "sandwiched between," two or more other elements, the first element can be directly between the two or more other elements or intervening elements may also be present between the two or more other elements. For example, if a first element is "between" or "sandwiched between" a second and third element, the first element can be directly between the second and third elements with no intervening elements or the first element can be adjacent to one or more additional elements with the first element and these additional elements all between the second and third elements.

FIG. 1 shows a simplified schematic view of an example embodiment of a contactor device 1 according to the present invention. FIG. 1 shows the contactor device 1 in an "open" circuit position, wherein electricity does not flow through the contactor device 1. The contactor device 1 of FIG. 1 comprises a body 4 (also referred to as a housing 4), and two or more fixed contact structures 6*a*, 6*b* (two shown) which are configured to electrically connect the internal components of the contactor device to external circuitry, for example, to an electrical system, circuit, or device. The body 4 can comprise any suitable material that can support the structure and function of the contactor device 1 as disclosed herein, with a preferred material being a sturdy material that can provide structural support to the contactor device 1 without interfering with the electrical flow through the fixed contacts 6*a*, 6*b* and the internal components of the device. In some embodiments, the body 4 comprises a durable plastic or polymer. The body 4 at least partially surrounds the various internal components of the contactor device 1, which are described in more detail further herein.

The body 4 can comprise any shape suitable for housing the various internal components including any regular or irregular polygon. The body 4 can be a continuous structure, or can comprise multiple component parts joined, for example, comprising a base body "cup," and a top "header" portion sealed with an epoxy material. Some example body configurations include those set forth in U.S. Pat. Nos. 7,321,281, 7,944,333, 8,446,240 and 9,013,254, all of which are assigned to Gigavac, Inc., the assignee of the present application, and all of which are hereby incorporated in their entirety by reference.

The fixed contacts 6*a*, 6*b* are configured such that the various internal components of the contactor device 1 that are housed within the body 4 can electrically communicate with an external electrical system or device, so that the contactor device 1 can function as a switch to break or complete an electrical circuit as described herein. The fixed contacts 6*a*, 6*b* can comprise any suitable conductive material for providing electrical contact to the internal components of the contactor device, for example, various metals and metallic materials or any electrical contact material or structure that is known in the art. The fixed contacts 6*a*, 6*b* can comprise single continuous contact structures (as shown) or can comprise multiple electrically connected structures. For example, in some embodiments, the fixed contacts 6*a*, 6*b* can comprise two portions, a first portion extending from the body 4, which is electrically connected to a second portion internal to the body 4 that is configured to interact with other components internal to the body as described herein.

The body 4 can be configured such that the internal space of the body 4, which houses the various internal components of the contactor device 1, is hermetically sealed. When coupled with the use of electronegative gas, this hermetically sealed configuration can help mitigate or prevent electrical arcing between adjacent conductive elements, and in some embodiments, helps provide electrical isolation between spatially separated contacts. In some embodiments, the body 4 can be under vacuum conditions. The body 4 can be hermetically sealed utilizing any known means of generating hermetically sealed electrical devices. Some examples of hermetically sealed devices include those set forth in U.S. Pat. Nos. 7,321,281, 7,944,333, 8,446,240 and 9,013,254, mentioned above and incorporated into the present by reference.

In some embodiments, the body 4 can be at least partially filled with a gas, for example, hydrogen, helium, carbon dioxide, sulfur hexafluoride, nitrogen, or combinations of the gases. These gases can provide different properties to improve operation and reliability of the contactor 1, such as electronegative properties, redox or oxidation-reversing properties, thermal conductivity properties and electrically-insulative properties. In some embodiments, the body 4 comprises a material having low or substantially no permeability to a gas injected into the housing. These are only some of the materials that can be included in the body 4 as desired, with some embodiments comprising other gasses, or liquids or solids configured to increase performance or reliability of the device 1.

When not interacting with any of the other components internal to the body 4, the fixed contacts 6*a*, 6*b* are otherwise electrically isolated from one another such that electricity cannot freely flow between the two. The fixed contacts 6*a*, 6*b* can be electrically isolated from one another through any known structure or method of electrical isolation.

When the contactor device 1 is in its "open" position, as shown in FIG. 1, both the electrically isolated fixed contacts 6*a*, 6*b* are not contacted by a moveable contact 8, such that current does not flow through the device 1. When the movable contact 8 moves up to contact the fixed contacts 6*a*, 6*b*, the contactor device changes to its "closed" state where the moveable contact 8 functions as a conductive bridge allowing an electrical signal to flow between the fixed contacts 6*a*, 6*b*, and through the contactor device 1. For example, the electrical signal can flow from the first fixed contact 6*a*, through the moveable contact 8, to the second contact 6*b* or vice versa. Therefore, the contactor device 1 can be connected to an electrical circuit, system or device and complete a circuit while the moveable contact 8 is in electrical contact with the fixed contacts 6*a*, 6*b*.

The moveable contact 8 can comprise any suitable conductive material including any of the materials discussed herein in regard to the fixed contacts 6*a*, 6*b*. In some embodiments, the moveable contact can comprise copper. Like with the fixed contacts 6*a*, 6*b*, the moveable contact 8 can comprise a single continuous structure (as shown), or can comprise multiple component parts electrically connected to one another so as to serve as a conductive bridge between the otherwise electrically isolated fixed contacts 6*a*, 6*b*, so that electricity can flow through the contactor device 1.

As mentioned, the moveable contact 8 can be configured such that it can move in and out of electrical contact with the fixed contacts 6*a*, 6*b*. Different embodiments can include different mechanisms to cause movement of the moveable contact 8. In some embodiments, including the embodiment shown in FIG. 1, the moveable contact 8 can be connected to a shaft structure 10, which is configured to move along a predetermined distance within the contactor device 1. The shaft 10 can comprise any material or shape suitable for its function as an internal moveable component allowing the moveable contact 8 to move with the shaft 10.

Movement of the shaft 10 controls movement of the moveable contact 8, which in turn controls the position of the moveable contact 8 in relation to the fixed contacts 6*a*, 6*b*. This in turn controls flow of electricity through the contactor device 1 as described herein. Movement of the shaft can be controlled through various configurations, including, but not limited to, electrical and electronic, magnetic and solenoid, and manual. Example manual configurations for controlling a shaft connected to a moveable contact are set forth in U.S. Pat. No. 9,013,254, mentioned above and incorporated herein by reference. Some of these example configurations of manual control features include magnetic configurations, diaphragm configurations and bellowed configurations.

In the embodiment shown in FIG. 1, movement of the shaft 10 is controlled with a solenoid configuration. A solenoid 2 is included internal to the housing 4 and operates on the drive shaft 10 to move the movable contact 8. Many different solenoids can be used, with one example of a suitable solenoid being a solenoid operating under a low voltage and with a relatively high force. One example of a suitable solenoid is commercially available solenoid Model No. SD1564 N1200, from Bicron Inc., although many other solenoids can be used. In the embodiment shown, the drive shaft 10 can comprise a metallic material that can be moved and controlled by the solenoid 2 in response to the magnetic field generated by the solenoid. The device 1 can also have an internal spring that biases the movable contact 8 to the desired position when the solenoid 12 is not acting on the drive shaft 10.

Levitation is a phenomenon wherein certain magnetic forces are generated internal to the contactor device to cause separation between the movable contact and fixed contacts that overcomes the closing force provided by the internal components. Although the inventors do not want to be limited to any one theory of operation, it is understood that there can be at least three factors that result in levitation between the contacts. The first is current constriction, the second is due to parallel conductors with current flow in opposing directions, and the third is current flow perpendicular to the field of the arc suppression magnets.

It is understood that moving charges create their own magnetic fields, with current carrying conductors capable of enacting forces on one another. Parallel currents in conductors can cause magnetic fields that result in an attraction between the conductors. Antiparallel currents can create magnetic fields that cause repulsion between the conductors. Levitation occurs as the result of the magnetic field generated by a current in the switching device's internal contacts.

The first and second factors (current constriction and parallel conductors) can be influenced by the geometry of the stationary and movable contacts. In the embodiment shown, some of the relevant geometric features comprise the length of the contact bend, the contact thickness, the contact bend spacing, and the contact width.

Current constriction relates to the repulsive forces that can be generated between the contacts by current conducting between the two contacts across less than the entire contact surface. When conducting an electrical signal between the stationary and movable contacts, current does conduct equally across the contact surface at the interface between the two. Instead, current is typically restricted to small regions (i.e., current constriction) at the contact interface. This causes the current flowing through the contacts to change direction toward the region. This in turn creates first and second current vectors in the opposing contacts that have a component that is substantially parallel to the interface. The parallel components are in opposite directions creating magnetic fields that are opposite to one another. This in turn creates a repulsive force between the contacts.

As the current flowing through the contacts increases, this repulsive force can also increase, and the repulsive acts on the contacts in a direction against the contact holding force. This repulsive force can be significant at higher currents, and levitation between the contacts can occur when this repulsive force exceeds the force between the contacts. This levitation force in turn can cause the movable contact to separate from the stationary contact against the contact holding force.

Current flowing through the contacts can similarly cause a repulsive force between the two. The current flow during operation conducts through the stationary contact and the movable contact. The stationary contact bend has a length where current is flowing in the opposite direction to the current flowing in the movable contact. This also creates opposing magnetic fields that creates a repulsive force between the contacts. This repulsive force can also increase as the current increases.

The positioning of the arc suppression magnets within a contactor can also contribute to levitation. Some embodiments of a switching device can comprise arc magnets that can be positioned such that arcs between stationary and movable contacts are pushed outward. This magnet configuration can result in unidirectional break performance with the contacts. The orientation of the magnets can also result in the movable contact being forced downward in opposition to the closing force between the contacts. Electrons moving through a magnetic field can be moved in a particular direction.

As mentioned above, levitation can cause certain undesirable conditions within the contactor device. One is the undesired separation of the movable contact from the fixed contact at elevated current levels, with the separation being against the closing force of the solenoid or the closing spring. This can result in the undesired interruption of an electrical circuit. Arcing can also occur between the fixed and movable contacts when levitation causes separation of the fixed and moveable contacts.

Referring again to FIG. 1, to help hold the movable contact to the fixed contacts against these levitation forces, the movable contact 8 can have an upper yoke **10*a* and a lower yoke 12. The upper yoke 10*a* and lower yoke 12 are on the movable contact 8, with the movable contact sandwiched between the upper yoke 10*a* and lower yoke 12. When the movable contact 8 and the fixed contacts 6*a*, 6*b* are in contact with each other to allow the flow of electric current, the upper yoke 10*a* and the lower yoke 12 form a magnetic circuit to produce magnetic force. This in turn causes the upper yoke 10*a* and the lower yoke 12 to attract each other, and thus restrict the movement of the movable contactor 8 away from the fixed contacts 6*a*, 6*b*. This attraction force acts against the levitation separation forces to hold the movable contact 8 in contact with the fixed contacts 6*a*, 6*b***.

The lower yoke 12 is on and covering a portion of the underside of the movable contact 8. The upper yoke **10*a* is on and covering a portion of the topside of the movable contact 8. In the embodiment shown, the upper and lower yokes 10*a*, 12 cover most of their respective underside and topside surfaces, but it understood that either or both could cover less than most of their respective surface. The yokes 10*a*, 12 can be made of many different conductive materials, such as a metal material or combinations of ferromagnetic metal materials. In some embodiments the yokes 10*a*, 12** can comprise steel or iron.

As discussed above, the addition of yokes **10*a*, 12** on the movable contact increases the number of parts in the contactor and increases the complexity of the manufacturing process. In the embodiments of the present invention, the upper yoke and at least a portion of the drive shaft are formed/manufactured as a single integral component. As described in more detail below, in the embodiments where less than all of the shaft is formed integral to the upper yoke, the upper yoke can be arranged to that it is reliably joined with the remaining portion of the shaft to link the shaft and yoke assembly to the solenoid drive element.

Figure 2:
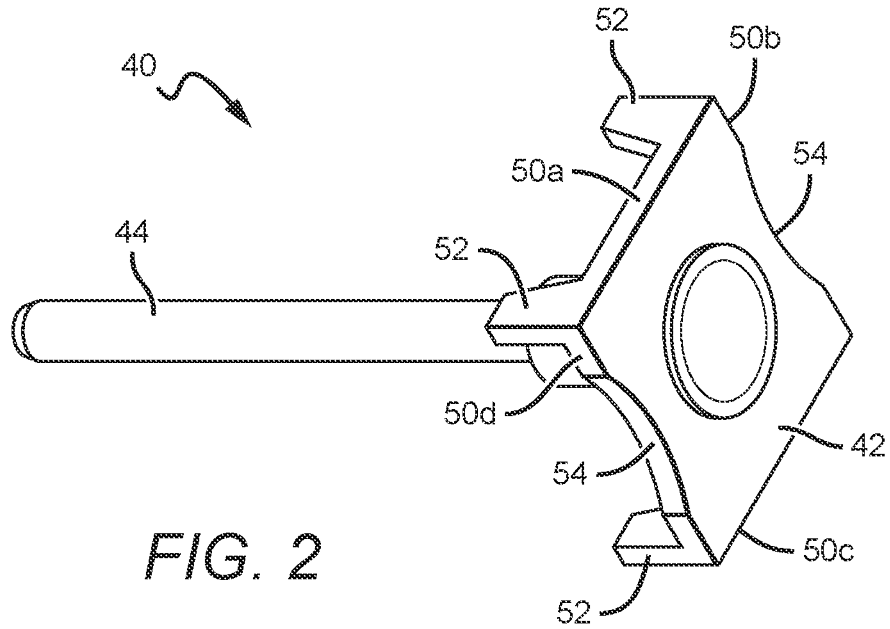
FIG. 2 is a perspective view of one embodiment of an integral component comprising an integrated drive shaft and upper yoke.
Figure 3:
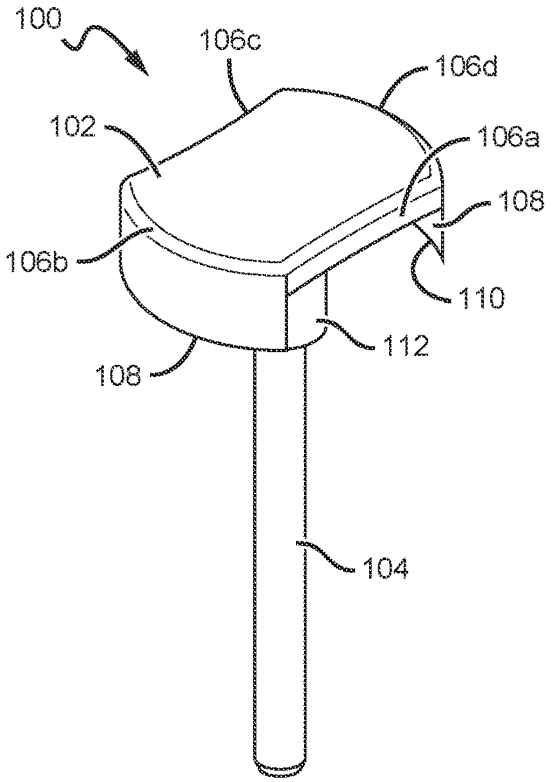
FIG. 3 is an upper perspective view of another integral component comprising an integrated drive shaft and upper yoke.
Figure 4:
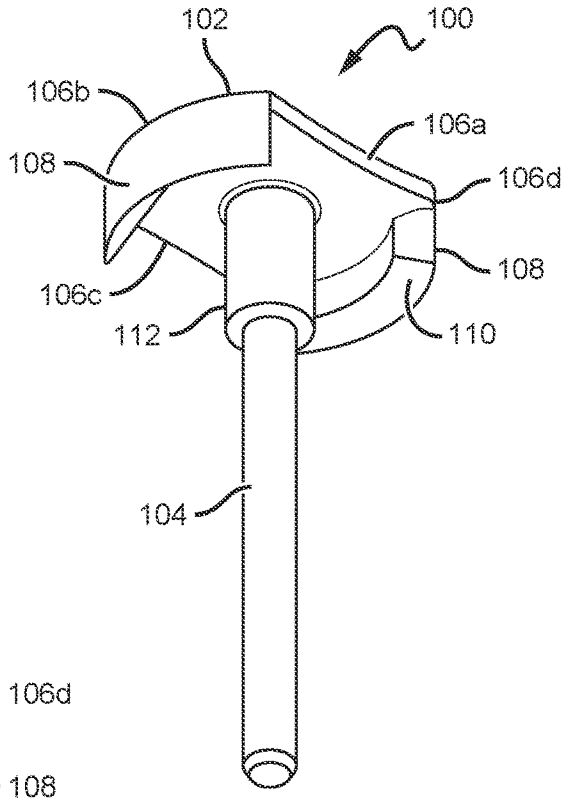
FIG. 4 is bottom perspective view of the integrated drive shaft and yoke component shown in FIG. 3.
Figure 5:
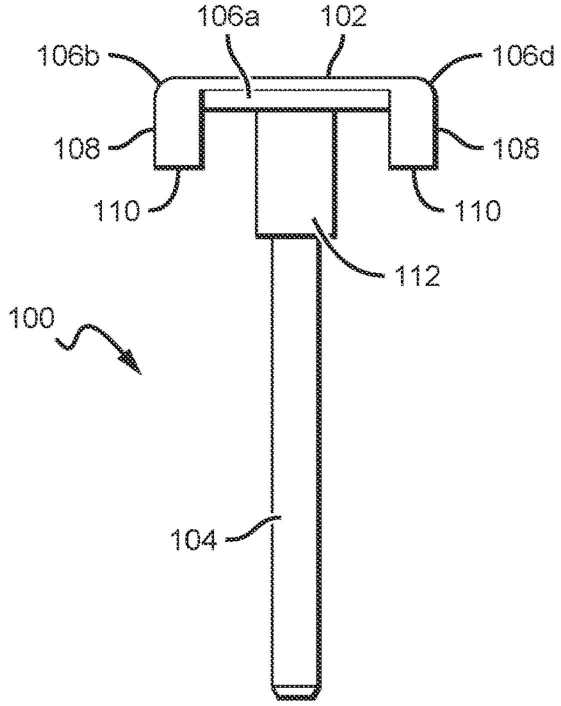
FIG. 5 is a side view of the integrated drive shaft and yoke component shown in FIG. 3.
Figure 6:
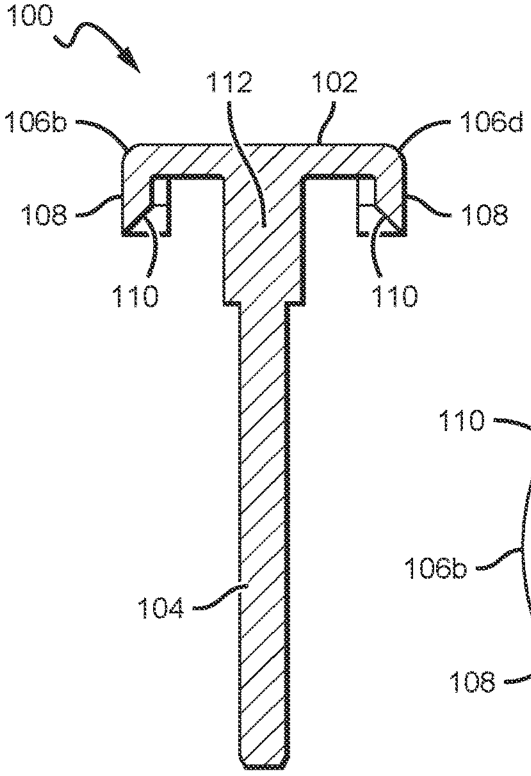
FIG. 6 as a sectional side view of the integrated drive shaft and yoke component shown in FIG. 3.
Figure 7:
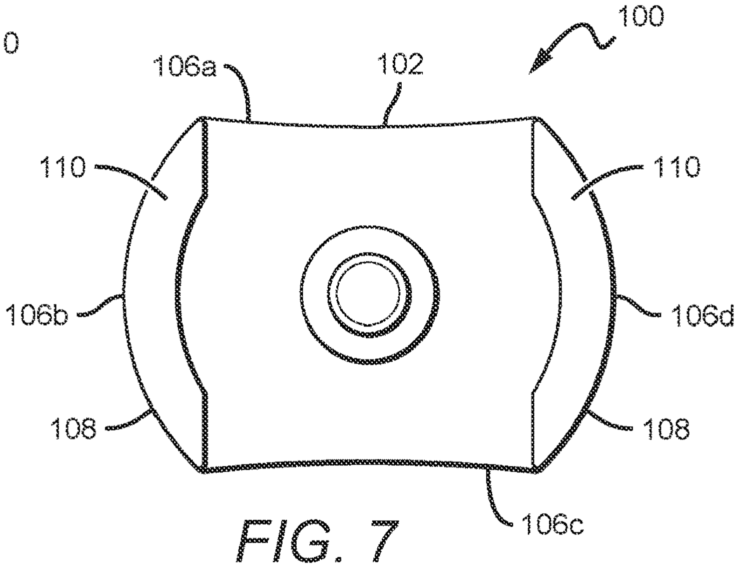
FIG. 7 is a bottom view of the integrated drive shaft and yoke component shown in FIG. 3.

FIG. 2 shows one embodiment of an integral component 40 comprising an upper yoke portion 42 formed integral to the entire drive shaft 44 during manufacturing. The integral component 40 can be formed using many different manufacturing processes, with some including machining, sintering, cold heading or forging, casting (e.g., die casting, investment casting, steel casting, etc.), powdered metal (PM) sintering, and metal injection molding (MIM). It is understood that these are only some of the manufacturing methods that can be used according to the present invention.

The integral component can have many shapes and sizes and can be made of many different materials or combination of materials mentioned above, with a preferred material being rugged, electrically conductive and having the desired magnetic properties. In some embodiments, the integral component can be made of a metal or combinations of metals, with some embodiments being made of steel or iron. In other embodiments, different portions of the integral component can be made of different materials.

As discussed above, the upper and lower yokes generate an anti-levitation magnetic field that resists the undesired opening of the movable contact away from the fixed contact caused by levitation magnetic forces. By having the yoke integral to the drive shaft (or drive shaft extension) according to the present invention the anti-levitation performance can be improved over previous arrangements where the yokes are formed separately from the drive shaft. The integral upper yoke and drive shaft can also result in a contactor device being less complex and easier to manufacture. The integral component can also provide more reliable operation and longer lifespan for the contactor device.

In different embodiments, the upper and lower yokes can have yoke features that can shape the magnetic field produced during operation to give the yokes the desired anti-levitation operation. These features can include different shapes of protrusions, or indentations in different surfaces of the yokes. In some embodiments, the yoke features in the upper and lower yokes can be shaped and arranged to cooperate with one another, such as by having an overlap or meshing of the features when the yokes are mounted on the movable contact.

Referring again to FIG. 2, the upper yoke portion 42 is generally square-shaped, but it is understood that the upper yoke 42 can have many different shapes. The upper yoke 42 comprises first, second, third and fourth edges 50*a-d*. In the embodiment shown the first and third edges 50*a*, 50*c* have protrusions 52 that can extend down toward the lower yoke (not shown). These protrusions 52 can help shape the magnetic field of the upper yoke and can cooperate with features of the lower yoke to further shape the magnetic field. For example, the lower yoke can have its own protrusions, wherein one or more of the protrusions and nest between the protrusion 52 when the upper and lower yokes are mounted on the movable contact. It is understood that the features in the different embodiments according to the present invention can have many different shapes and sizes and can cooperate and nest in many different ways beyond those described herein.

In the embodiment shown, the second and third edges 50*b*, 50*d* each have a curved indentation 54 that also shapes the magnetic field produced by the yokes. In some embodiments, the lower yoke can also comprise similar or different indentations in different locations. This is only one example of the different indentations that can be used in yokes according to the present invention.

The protrusions and indentations discussed herein can be used with yokes that are formed integral to the shaft or shaft extension according to the embodiments as described herein. It is understood that the protrusions and indentations can be used in yokes formed separate from the drive shaft and nothing in this application should be construed as limiting the protrusions and indentations to integral components or yokes arranged in any particular way on the drive shaft.

FIGS. 3-7 show another embodiment of an integral component 100 comprising an upper yoke portion 102 that is formed integral to the drive shaft 104 during manufacturing using one of the methods above or a combination of methods. Like the embodiment above, the upper yoke 102 (and lower yoke) can have yoke features that can shape the magnetic field produced during operation to give the yokes the desired anti-levitation operation.

The upper yoke 102 is generally rectangular and can comprise first, second, third and fourth edges 106*a-d*. The first and third edges 106*a*, 106*c* can be curved and concave, and the second and fourth edges 106*b*, 106*d* can be curved and convex. The second and fourth edges 106*b*, 106*c* can also comprise a vertical edge extension 108 that extend from their respective edge toward the opposing end of the drive shaft 106. In this embodiment, each vertical edge extension 108 extends the same length toward the end of the drive shaft 104. Each vertical edge extension 108 has a bottom edge 110 that is angled up toward to the top of drive shaft moving from the other surface to the inner surface of the extension 108.

By angling the bottom edge 110 in this manner, the surface area of the bottom edge is increased compared to a bottom edge that is flat. In some embodiments as described below, the lower yoke can also have an angled surface that mates with one or both angled surfaces 110 in the upper yoke 102. These increased surface areas compared to a flat bottom edge can provide for an increase in the magnetic field generated between the upper yoke 102 and the lower yoke (shown below). This in turn can increase the attraction force between the upper and lower yoke to resist levitation between the moving and fixed contacts. It is understood that other embodiments can have edges that angle in many different ways, and it is understood that other embodiments the edges can have flat surfaces.

The integral component 100 also have other features that provide for reliable operation of a contactor using the component 100. The concave and convex shapes of the edges 106*a-d* helps reduce the likelihood that one of the edges 106*a-d* might catch or interfere with other components within the contactor during operation. Similarly, the transition between the second and fourth edges 106*b*, 106*d* and its vertical edge extension 108 is rounded to further reduce the risk that the edge will catch on another component in the contactor. The first and third edges are similarly rounded.

The component 100 is shown with two extensions 108 extending the same distance along edges 102*b*, 102*d*. In other embodiments, other extensions can be included that have different shapes and sizes, and do not need to be the same shape and size on the two edges. In still other embodiments, the extensions can different cut-outs and protrusion to provide the desired magnetic interaction between the upper and lower yokes.

The component 100 also comprises a widened shaft extension 112 extending down from the underside of the upper yoke 102 and at top of the drive shaft 104. This widened section can be made of the same ferromagnetic material as the upper yoke, and when integrated into a contact assembly, this widened portion can extend through the movable contact and to/through the lower yoke. This widened section 112 can improve the magnetic field generated by the yokes and can increase the holding force of the yokes against levitation.

In some embodiments as described below, this shaft extension 112 can be formed integral to the upper yoke, while the remaining portion of the drive shaft 104 is formed separately. In these embodiments, the remaining portion of the drive shaft can then be connected to the upper yoke and/or is yoke extension 112 to complete the component 102.

Figure 8:
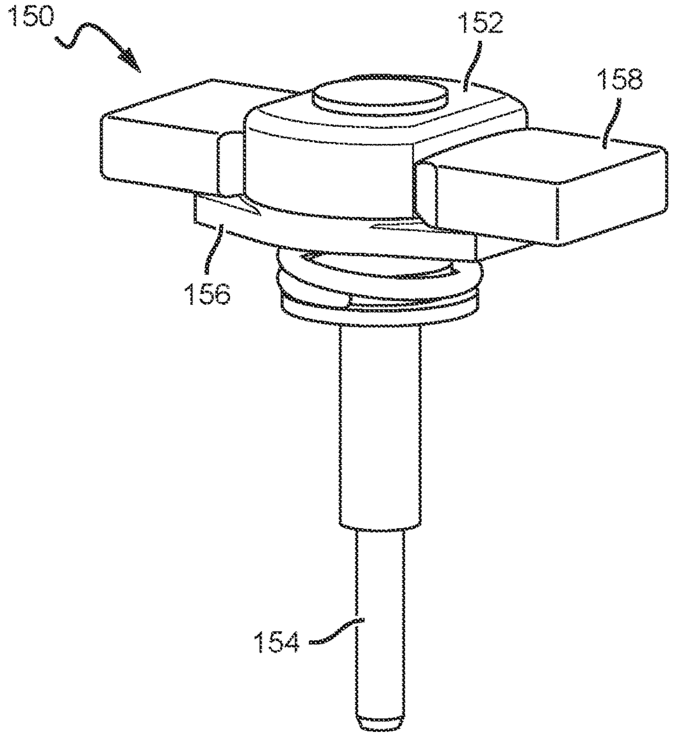
FIG. 8 is a perspective view of one embodiment of a drive shaft, yoke, and contact assembly according to the present invention.

FIG. 8 shows one embodiment of movable contact assembly 150 according to present invention that can be used in contactors as described above. The movable contact assembly 150 generally comprises an upper yoke 152, drive shaft 154, lower yoke 156 and movable contact 158. As discussed herein, the drive shaft 154 can be formed integral to the upper yoke 152, while in other embodiments that the drive shaft 154 can be formed separately and then mounted to a shaft extension in the upper yoke 152.

The drive shaft 154 moves under control of a solenoid (not shown) as described above, to move the movable contact 158 in and out of contact with the fixed contacts. The upper yoke 152 and lower yoke 156 are arranged to wrap around the middle portion of the movable contact and to provide magnetic attraction between the two to resist levitation between the fixed contacts and the movable contact 158 when elevated currents pass through the contact 158.

In the embodiment shown of the assembly 150, the movable contact 150 is narrower near its middle. This allows for the upper yoke 152 to be arranged over the movable contact without increasing the overall width of the movable contact 158 and upper yoke combination. This helps keep the assembly as narrow as the width of the movable contact 158. This keeps the assembly 150 compact and further reduces that edges that might catch or interfere with other components in the contactor 150. It is understood that this is only one of the different arrangements and shapes for the yoke and movable contact. For example, in other embodiments the movable contact may not be narrower near its middle.

Figure 9:
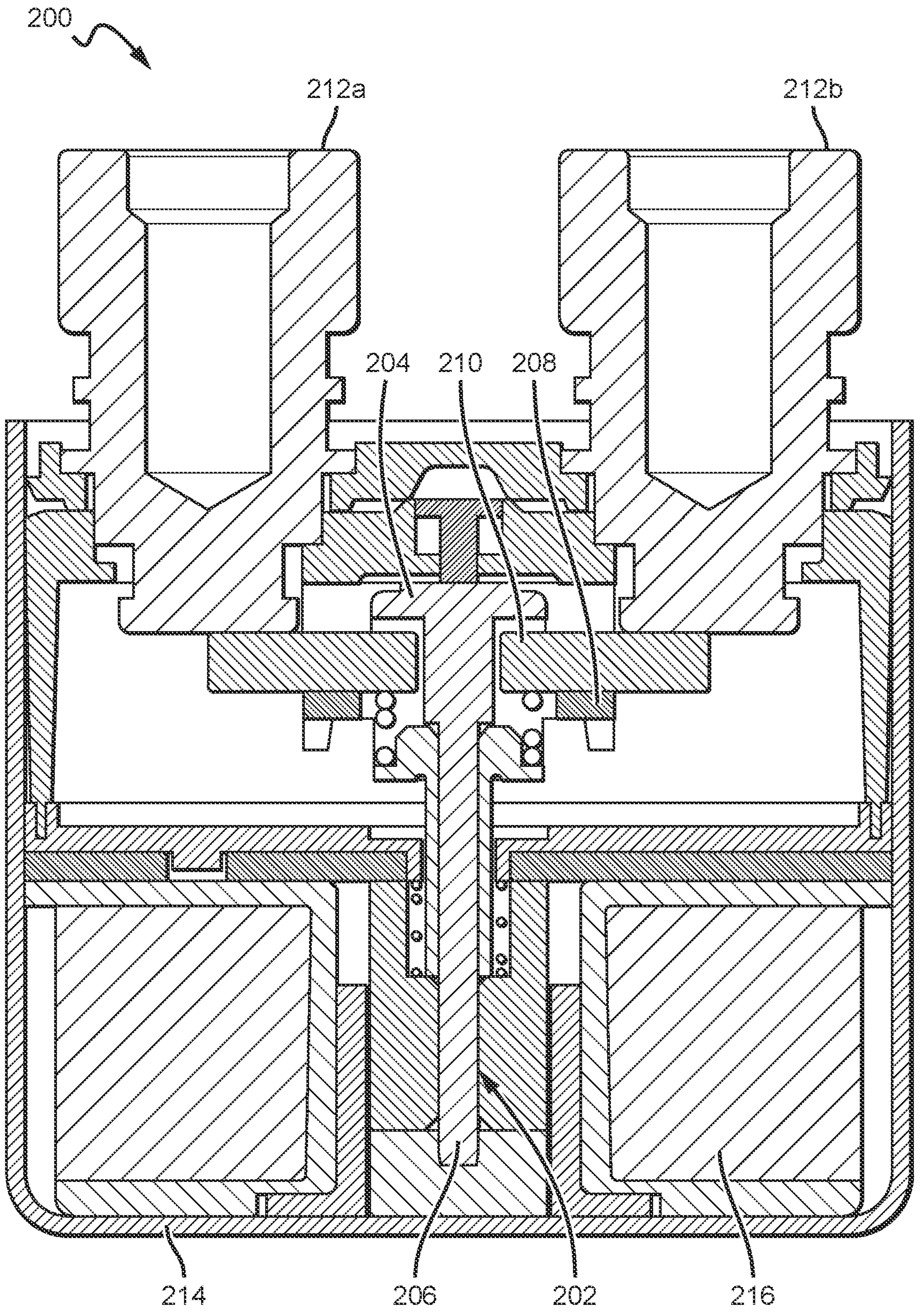
FIG. 9 is a sectional view of one embodiments of contactor assembly according to the present invention.
Figure 10:
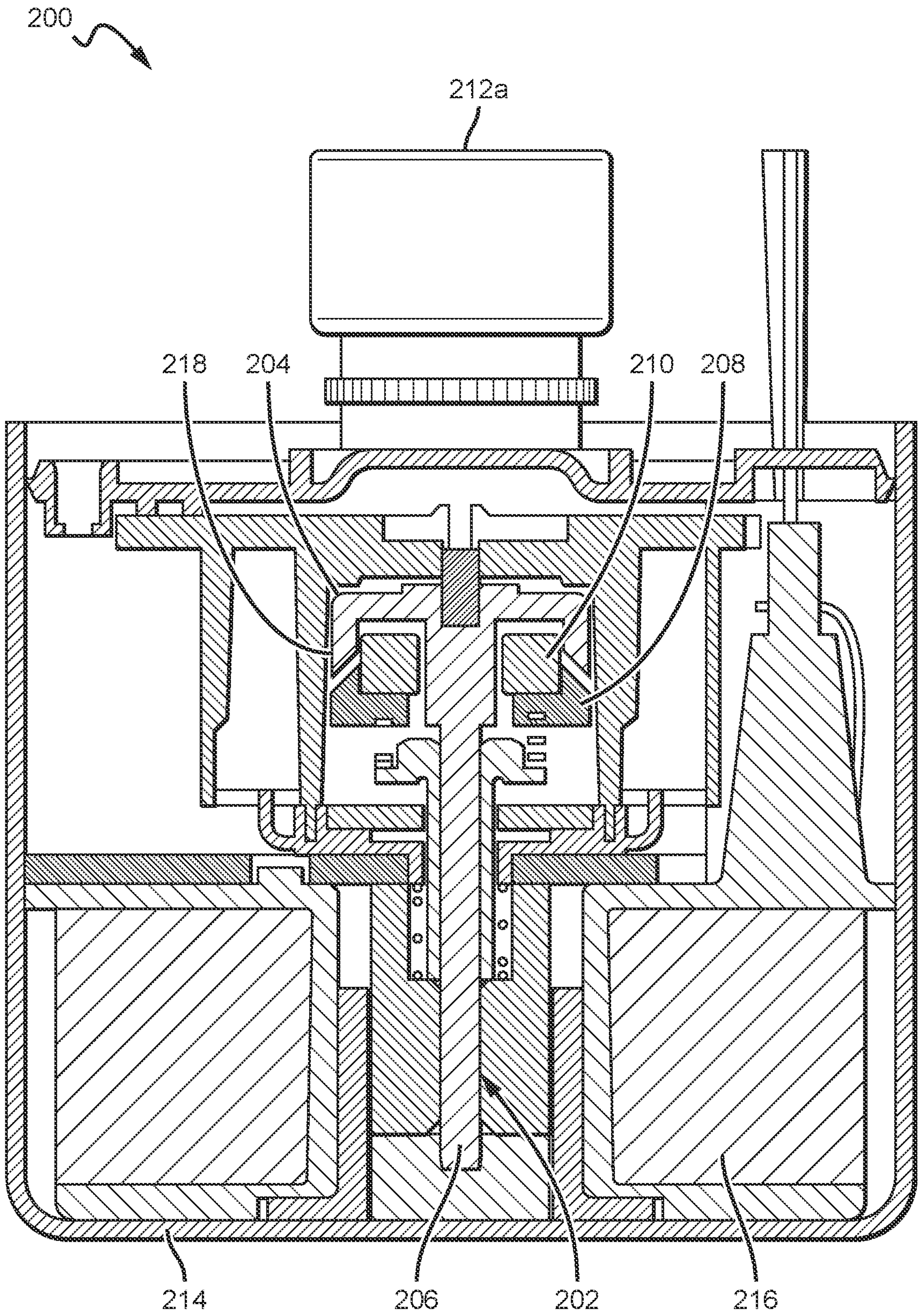
FIG. 10 is another sectional view of the contactor assembly shown in FIG. 9.
Figure 11:
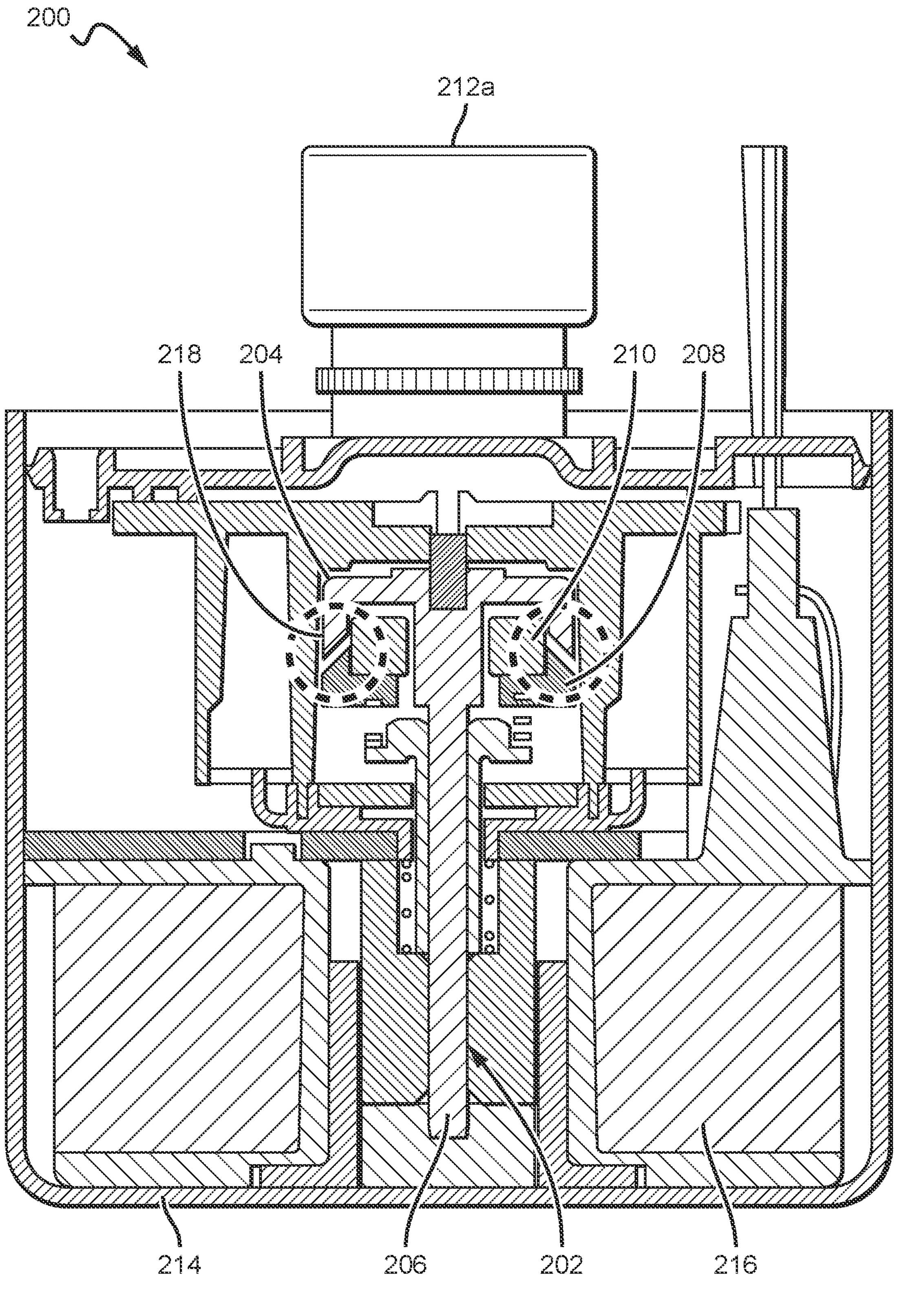
FIG. 11 is another section view of a contactor assembly shown in FIG. 9.
Figure 12:
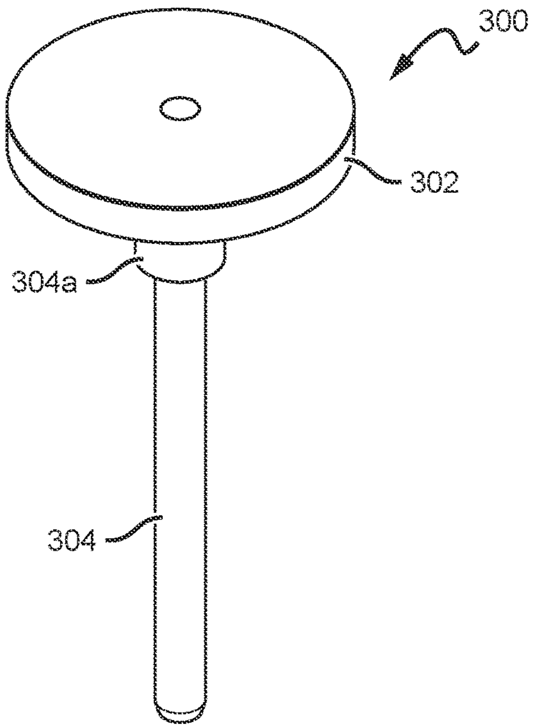
FIG. 12 is a perspective view of another embodiment of an integrated drive shaft and yoke integral component according to the present invention.
Figure 13:
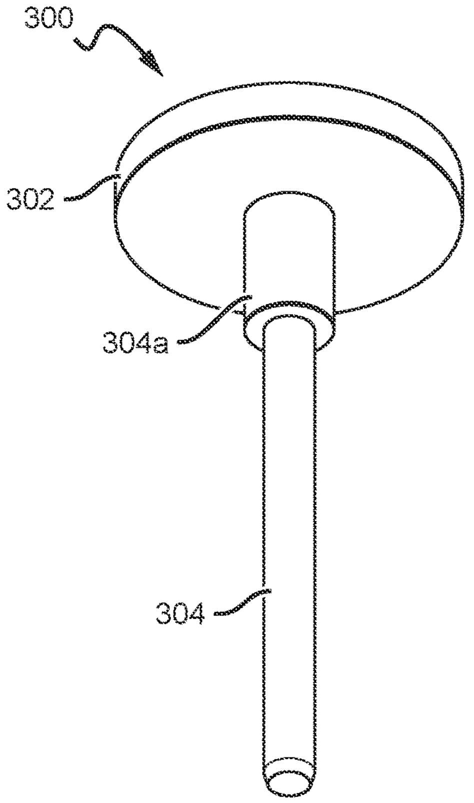
FIG. 13 is another perspective view of the integral drive shaft and yoke component shown in FIG. 12.
Figure 14:
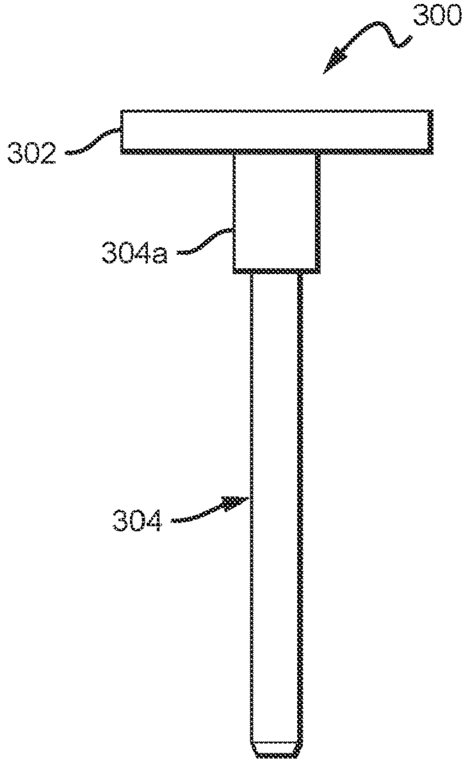
FIG. 14 is a side view of the integral drive shaft and yoke component shown in FIG. 12.
Figure 15:
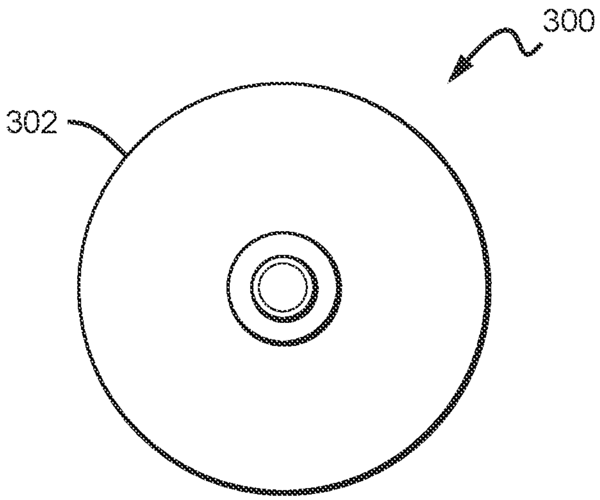
FIG. 15 is top view of the integral drive shaft and yoke component shown in FIG. 12.

FIG. 9-11 show one embodiment of a contactor 200 that utilizes an integral component 202 comprising an upper yoke 204 with an integral drive shaft 206. The contactor also comprises a lower yoke 208, movable contact 210, and fixed contacts 212*a*, 212*b*, with the contactor 200 shown in its closed state with the movable contact 210 in contact with fixed contacts 212*a*, 212*b*. As described above, the internal components of the contactor 200 are held inside a housing 214 and a solenoid 216 is provided that can be operated to move the movable contact 210 in and out of contact with the fixed contact 212*a*, 212*b*.

Referring now to FIGS. 10 and 11, the lower edge of the vertical edge extension 218 has an angled surface on its edge as described above. The lower yoke 208 has a similar angled surface to match the angled surface of the shaft extension. These angled surfaces increase the surface area of the edges of the shaft extension and the lower yoke to increase the magnetic field generated between the two during elevated currents through the movable contact 210 and the fixed contacts 212*a*, 212*b*. This helps the upper and lower yokes 204, 208 to produce the desired magnetic field to resist levitation force separation of the movable contact 210 and fixed contact 212*a*, 212*b*. This also allows the upper and lower yokes 204, 208 to wrap the narrowed portion of the moveable contact 210 in ferromagnetic material to provide the desired magnetic field to oppose levitation.

As mentioned above, the integrated yoke and drive shaft can be arranged in many different ways, with many different shapes and sizes. Furthermore, in some embodiments all or a portion of the shaft and upper yoke assembly can comprise more than one piece. For example, the yoke assembly can comprise an upper yoke with an integral shaft extension and a separate shaft portion. In these embodiments, the shaft portion can be coupled to the shaft extension of the upper yoke, and the shaft portion can serve to link the yoke and drive shaft assembly to the solenoid.

Having an upper yoke with a shaft extension and separate shaft portions can provide certain advantages, such as allowing for the parts to made of different materials. This can allow for the use of lower cost materials for different ones of the parts, and can also allow for use of material more suited for the particular portion. For example, the shaft portion can be made of material that may more efficiently link to the solenoid, while maintaining improvements to the anti-levitation magnetic field generated through the use of the shaft extension. This arrangement with separate parts can also reduce costs by allowing for certain of the parts to be manufactured using lower cost methods.

FIGS. 12-15 show another embodiment of an integral component 300 according to the present invention comprising an upper yoke 302 and drive shaft 304. In this embodiment, the upper yoke 302 is disk shaped with no vertical edge extensions, which allows for ease of manufacturing. It is understood that other embodiments can have different shapes such as square, rectangular, pentagon, hexagon, octagon, etc., with some of these embodiments having axial symmetry around the drive shaft 304. The upper yoke 302 can be sized to cover a portion of the movable contact and/or can be sized to extend over one or more edges of the movable contact.

Figure 16:
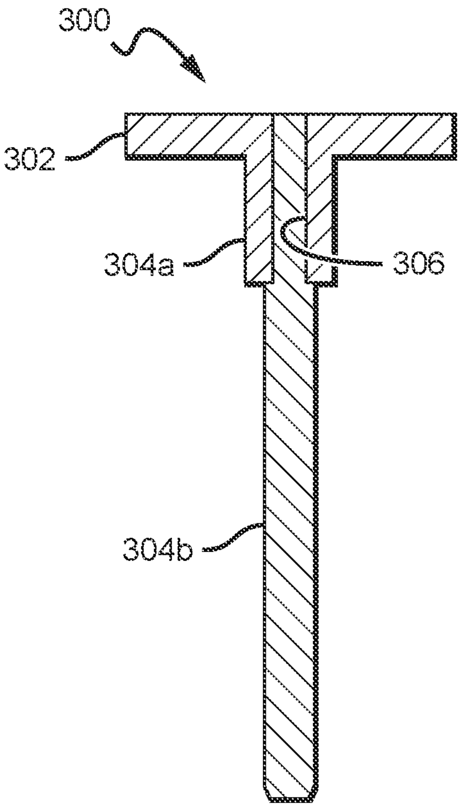
FIG. 16 is a sectional view of the integral drive shaft and yoke component shown in FIG. 12.
Figure 17:
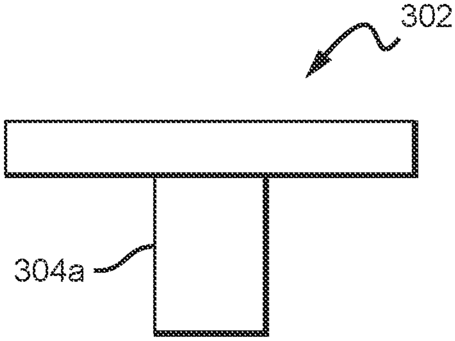
FIG. 17 is side view of the upper portion of the integral drive shaft and yoke component according to the present.

Like the embodiments above, the drive shaft 304 can be formed integral to the upper yoke 302 as a single component. This provides the advantages mentioned above. In other embodiments, the upper yoke 302 can be formed with an integral portion of the drive shaft in the form of a drive shaft extension. A separate drive shaft portion can then be mounted to the upper yoke or its drive shaft extension. Referring to FIGS. 16 and 17, the integral component 300 is shown comprising separately formed upper yoke 302 and shaft portion 304*b*. The upper yoke 302 further comprises a shaft extension 304*a* that extends axially from the center of the yoke 302. In the embodiment shown, the shaft extension 304*a* has a hollow section 306 that can be sized to accept one end of the shaft portion 304*b*. In the embodiment shown, the hollow portion 306 extends through the shaft extension 304*a*.

The shaft portion 304*b* can be coupled to the shaft extension 304*a* of the upper yoke using many different attachment methods and arrangements. Some of these can include methods such as press-fit, welding, brazing, riveting, or threading the hollow portion 306 to the shaft portion 304*b*. In other embodiments, the end of the shaft portion 304*b* can extend from the top surface of the upper yoke 302 and can then be deformed to mount the shaft portion 304*b* to the upper yoke 302. In some embodiments, the upper surface of the upper yoke 302 can have a recess or indentation around the opening of the hollow portion 306. The deformed portion of that shaft portion 304*b* can fill the recess or indentation so that the top surface of the upper yoke 302 remains substantially flat. Other embodiments can be provided without this indent or recess, so that the deformation of the shaft portion can result is a raised portion on the top surface of the upper yoke 302.

The shaft extension 304*a* of the upper yoke 302 can also comprise a widened section arranged similar to the widened section described above. Like above, the widened hollow portion can pass through the movable contact and to/through the lower yoke to form the desired magnetic field to oppose levitation.

The upper yoke 302 and shaft extension 304*a* can comprise any of the ferromagnetic materials described above. The shaft portion 304*b* can also comprise the same material as the upper yoke, or can comprise of different material. Some of these differing materials can allow for the shaft portion to better to the solenoid. The upper yoke can be manufactured using the methods listed above. The shaft extension 304*b* can be manufactured using many known and efficient manufacturing processes.

Figure 19:
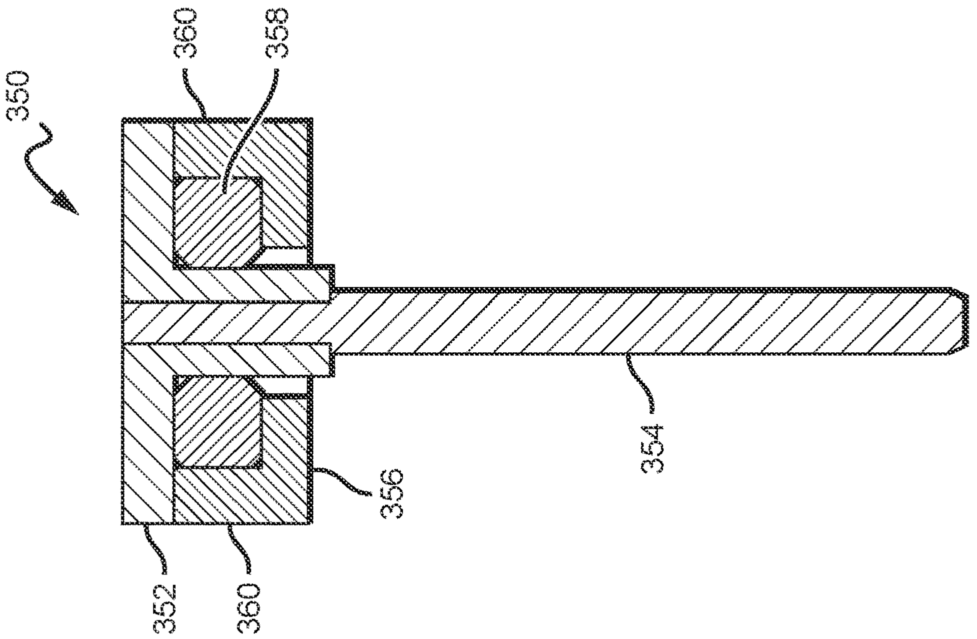
FIG. 19 is a sectional view of assembly shown in FIG. 18 taken along section lines 19-19.
Figure 18:
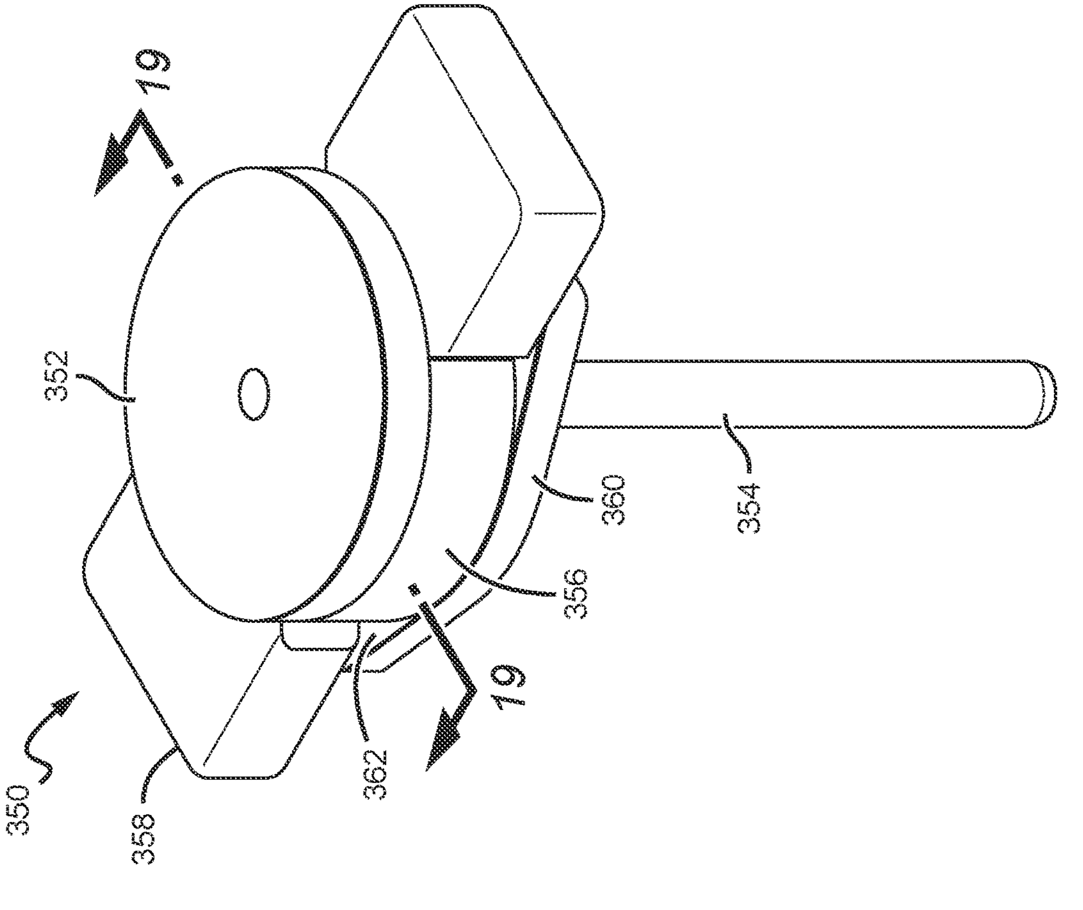
FIG. 18 is perspective view of a contactor, drive shaft and yoke assembly according to the present invention.

FIGS. 18 and 19 show another embodiment of a movable contact assembly 350 according to present invention that can be used in contactors as described above. The movable contact assembly 350 generally comprises an upper yoke 352, drive shaft 354, lower yoke 356 and movable contact 358. The upper yoke 352 and drive shaft can be formed integral, or as two or more separate pieces as described above. Like the contact assembly described above and shown in FIG. 8, the drive shaft 354 moves under control of a solenoid (not shown) to move the movable contact 358 in and out of contact with the fixed contacts. The upper yoke 352 and lower yoke 356 are arranged to provide magnetic attraction between the two to resist levitation between the fixed contacts and the movable contact 358 when elevated currents pass through the contacts.

The movable contact 358 has a middle narrow portion as described above, and the upper yoke 352 is circular and extends past the edge of the movable contact 358 at the narrow portion. The lower yoke 356 extensions 360 extend up to the upper yoke 352 so that upper and lower yokes 352 and 356 wrap around the narrow portion of the movable contact 356. The lower yoke 356 can also have lateral extensions 362 that extend beyond the narrow portion of movable contact 356 to cover a greater portion of the movable contact's lower surface. As with the embodiments above, the upper yoke 352 and lower yoke 356 are arranged to generate magnetic fields to resist levitation forces.

Although the present invention has been described in detail with reference to certain preferred configurations thereof, other versions are possible. Embodiments of the present invention can comprise any combination of compatible features shown in the various figures, and these embodiments should not be limited to those expressly illustrated and discussed. For example, each of the components above that are described as being formed integral, can also be formed of separate parts that can be assembled. Therefore, the spirit and scope of the invention should not be limited to the versions described above.

The foregoing is intended to cover all modifications and alternative constructions falling within the spirit and scope of the invention, wherein no portion of the disclosure is intended, expressly or implicitly, to be dedicated to the public domain if not set forth in any claims.

We claim:

1. A contact assembly, comprising:
- a movable contact having an underside surface and a topside surface;
- a drive shaft arranged to move said movable contact;
- a lower yoke on said underside surface; and
- an upper yoke on said topside surface, said upper yoke comprising:
  - said drive shaft, and
  - a shaft extension passing through said movable contact and said lower yoke, said shaft extension integral to said upper yoke and said drive shaft,
- wherein the upper yoke and the lower yoke:
  - form a magnetic circuit to produce a magnetic force,
  - attract each other, and
  - restrict movement of said movable contact, and
- wherein said upper yoke comprises extensions or protrusions.

2. The contact assembly of claim 1, wherein said movable contact has a narrow portion, wherein said upper and lower yokes at least partially surround said narrow portion.

3. The contact assembly of claim 1, wherein said upper and lower yokes wrap at least a portion of said movable contact.

4. The contact assembly of claim 1, wherein said lower yoke comprises one or more edge extensions, protrusions, or indentations.

5. The contact assembly of claim 4, wherein at least one of said edge extensions, protrusions or indentations comprises an angled edge.

6. The contact assembly of claim 1, wherein said shaft extension comprises a hollow portion, wherein a portion of said drive shaft is in said hollow portion.

7. The contact assembly of claim 1, wherein said shaft extension is wider than said drive shaft.

8. An electrical switching device, comprising:
- a housing; and
- internal components within said housing, said internal components comprising:
  - fixed contacts electrically isolated from one another, said fixed contacts at least partially surrounded by said housing;
  - a movable contact having a top surface and a bottom surface, and is movable to allow current flow between said fixed contacts when the movable contact contacts said fixed contacts;
  - a drive shaft to move said movable contact;
  - a lower yoke on said bottom surface; and
  - an upper yoke on said top surface, said upper yoke has comprising:
    - said drive shaft, and
    - a shaft extension passing through said movable contact and said lower yoke, said shaft extension integral to said upper yoke and said drive shaft,
- wherein said upper yoke and said lower yoke:
  - form a magnetic circuit to produce a magnetic force,
  - attract each other, and
  - restrict movement of said movable contact away from said fixed contacts, and
- wherein said upper yoke comprises extensions or protrusions.

9. The switching device of claim 8, further comprising a solenoid to drive said drive shaft.

10. The switching device of claim 8, wherein said movable contact has a narrow portion, wherein said upper and lower yokes at least partially surround said narrow portion.

11. The switching device of claim 8, wherein said lower yoke comprises extensions, protrusions, or indentations.

12. The switching device of claim 8, wherein said shaft extension comprises a hollow portion, wherein a portion of said drive shaft is in said hollow portion.

13. The switching device of claim 8, wherein said shaft extension is wider than said drive shaft.

14. An electrical system, comprising:

an electrical circuit; and an electrical switching device electrically connected to said electrical circuit to open or close said circuit, wherein said switching device comprises:

a housing;

internal components within said housing, said internal components comprising:

fixed contacts electrically isolated from one another;

a movable contact having a top surface and a bottom surface, and is movable to allow current flow between said fixed contacts when said movable contact contacts said fixed contacts;

a drive shaft to move said movable contact;

a lower yoke on said bottom surface;

an upper yoke on said top surface, said upper yoke comprising:

said drive shaft, and a shaft extension passing through said movable contact and said lower yoke, said shaft extension integral to said upper yoke and said drive shaft, wherein said upper yoke and said lower yoke:

form a magnetic circuit to produce a magnetic force, attract each other, and restrict movement of said movable contact away from said fixed contacts, and wherein said upper yoke comprises extensions or protrusions.

* * * * *